(12) United States Patent
Lacaze et al.

(10) Patent No.: US 10,377,379 B2
(45) Date of Patent: Aug. 13, 2019

(54) METHOD AND SYSTEM FOR UTILIZING THE ENERGY STORAGE PROVIDED BY A VEHICLE'S MASS IN THE FORM OF POTENTIAL AND KINETIC ENERGY TO OPTIMIZE FUEL CONSUMPTION

(71) Applicants: Alberto Daniel Lacaze, Potomac, MD (US); Karl Nicholas Murphy, Rockville, MD (US); Joseph Satoru Putney, Waterford, VA (US)

(72) Inventors: Alberto Daniel Lacaze, Potomac, MD (US); Karl Nicholas Murphy, Rockville, MD (US); Joseph Satoru Putney, Waterford, VA (US)

(73) Assignee: Robotic Research, LLC, Gaithersburg, MD (US)

( * ) Notice: Subject to any disclaimer, the term of this patent is extended or adjusted under 35 U.S.C. 154(b) by 0 days.

(21) Appl. No.: 13/662,429

(22) Filed: Oct. 27, 2012

(65) Prior Publication Data

US 2013/0297174 A1    Nov. 7, 2013

Related U.S. Application Data

(60) Provisional application No. 61/553,156, filed on Oct. 29, 2011.

(51) Int. Cl.
*B60W 30/14* (2006.01)
*B60W 50/00* (2006.01)

(52) U.S. Cl.
CPC ... *B60W 30/143* (2013.01); *B60W 2050/0077* (2013.01); *B60W 2050/0089* (2013.01); *B60W 2550/142* (2013.01); *B60W 2550/143* (2013.01); *B60W 2550/22* (2013.01); *B60W 2550/402* (2013.01); *B60W 2720/103* (2013.01)

(58) Field of Classification Search
CPC ........................... B60W 30/14; B60W 30/143
USPC .............................................. 701/93, 94, 123
See application file for complete search history.

(56) References Cited

U.S. PATENT DOCUMENTS

| | | | | |
|---|---|---|---|---|
| 7,127,348 | B2 * | 10/2006 | Smitherman et al. | 701/409 |
| 2007/0265759 | A1 * | 11/2007 | Salinas et al. | 701/123 |
| 2011/0276216 | A1 * | 11/2011 | Vaughan | 701/93 |
| 2012/0197504 | A1 * | 8/2012 | Sujan et al. | 701/70 |

* cited by examiner

*Primary Examiner* — Anshul Sood
(74) *Attorney, Agent, or Firm* — White-Welker & Welker, LLC; Matthew T. Welker

(57) ABSTRACT

A method and system that utilizes the energy storage provided by a vehicle's mass in the form of potential and kinetic energy to optimize the fuel consumption. The system of the present invention is composed of an elevation database, a localization mechanism, and a speed optimization mechanism/engine. The optimization engine receives a desired speed range from the operator such as a max speed and min speed input, and a route or elevation profile form the elevation database. Then, utilizing the elevation database, the localization mechanism and a weight estimate the system and method optimizes the current speed to minimize fuel consumption by way of setting and adjusting the cruise control speed. The route and the weight estimate may be provided or predicted by the optimization engine.

25 Claims, 10 Drawing Sheets

METHOD AND SYSTEM FOR UTILIZING THE ENERGY STORAGE PROVIDED BY A VEHICLE'S MASS IN THE FORM OF POTENTIAL AND KINETIC ENERGY TO OPTIMIZE FUEL CONSUMPTION

FEDERALLY SPONSORED RESEARCH

Not Applicable

SEQUENCE LISTING OR PROGRAM

Not Applicable

CROSS REFERENCE TO RELATED APPLICATIONS

Not Applicable

TECHNICAL FIELD OF THE INVENTION

This invention relates to vehicle fuel economy. In particular, the invention relates using a vehicle's potential and kinetic energy of a vehicle to improve fuel economy.

BACKGROUND OF THE INVENTION

Over the years, cruise control has minimized fuel consumption inefficiencies that result from oscillations around the cruising speeds for the typical driver. However, this improvement is mostly realized in flat terrains and at ideal speeds such as 55 mph highway speeds. However, experienced drivers are capable of higher fuel efficiency rates than state of the art cruise control systems. This is especially true for hilly routes. In fact, there is a large community of "hyper-milers" who compete against each other to get the best fuel economy from their vehicles. There are several reasons why this is possible:

Advanced drivers use their vehicle's inertia and the corresponding kinetic and potential energy. They use kinetic energy in the body of the vehicle to aid areas where more energy is needed such as hill climbing. In many cases, a driver may accelerate on flats before the hill to slowly accumulate the energy that will be consumed as the vehicle climbs the hill as this may be advantageous to the fuel economy of the vehicle. Likewise, they may be more likely to let the vehicle reach higher speeds at the end of a downhill, rather than breaking or using much less throttle and "coast" on the flat after the hill is has flattened out.

Advanced drivers tend to drive faster on downward slopes and slower on up-hills therefore reducing changes in throttle and thus reducing changes in engine power output.

As the vehicle goes uphill using a standard cruise control, the transmission sometimes downshifts to a lower gear. Even though a cruise control may provide hysteresis to reduce this effect, the standard cruise control is not aware of the elevation profile ahead and therefore cannot select the gear and throttle position for optimal fuel efficiency.

The fuel efficiency as a function of speed in a particular vehicle changes depending on a variety of factors which include: RPMs, gear, aerodynamic drag, rolling resistance, and the load that the engine is being subject to. As a driver sets the speed in the cruise control, this speed will seldom be the optimal. And more importantly, there is not a single speed that will maintain the vehicle at an optimal fuel economy given a particular elevation profile. It may sound counterintuitive, but under certain conditions, faster may be more fuel efficient. This is clearly illustrated at very slow speeds where the fuel efficiency increases significantly from parked, where fuel efficiency is 0.

Definitions

"Acceleration Profiles" are defined as sequences of throttle and gear commands resulting in a series of acceleration/deceleration sequences.

"DTED" (or Digital Terrain Elevation Data) is a standard of digital datasets which consists of a matrix of terrain elevation values. This standard was originally developed in the 1970s to support aircraft radar simulation and prediction. Terrain elevations are described as the height above the Earth Gravitational Model 1996 (EGM96) geoid, not the WGS84 reference ellipsoid. DTED supports many applications, including line-of-sight analyses, terrain profiling, 3-D terrain visualization, mission planning/rehearsal, and modeling and simulation. DTED is a standard National Geospatial-Intelligence Agency (NGA) product that provides medium resolution, quantitative data in a digital format for military system applications that require terrain elevation.

"Engine" is defined as a machine that converts energy into mechanical force or motion. Such a machine distinguished from an electric, spring-driven, or hydraulic motor by its use of a fuel.

"Motor" is defined as something, such as a machine or an engine, that produces or imparts motion as a device that converts any form of energy into mechanical energy, especially an internal-combustion engine or an arrangement of coils and magnets that converts electric current into mechanical power.

"RPM" of "RPMs" is the rate of revolution of a motor.

SUMMARY OF THE INVENTION

The present invention is a method and system that utilizes the energy storage provided by a vehicle's mass in the form of potential and kinetic energy to optimize the fuel consumption. The method and system of the present invention optimizes speed, taking into consideration the efficiency curve of the motor/gear combination for a given load.

One embodiment of the present invention is in the form of a "cruise control" that optimizes the speed within a speed range provided by the driver given the elevation profile of all or part of the route that vehicle will follow.

The system of the present invention is composed of an elevation database, a localization mechanism, and a speed optimization mechanism/engine. The optimization engine receives a desired speed range from the operator such as a max speed and min speed input, and a route or elevation profile form the elevation database. Then, utilizing the elevation database, the localization mechanism and a weight estimate the system and method optimizes the current speed to minimize fuel consumption by way of setting and adjusting the cruise control speed. The route and the weight estimate may be provided or predicted by the optimization engine.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Figure 1:
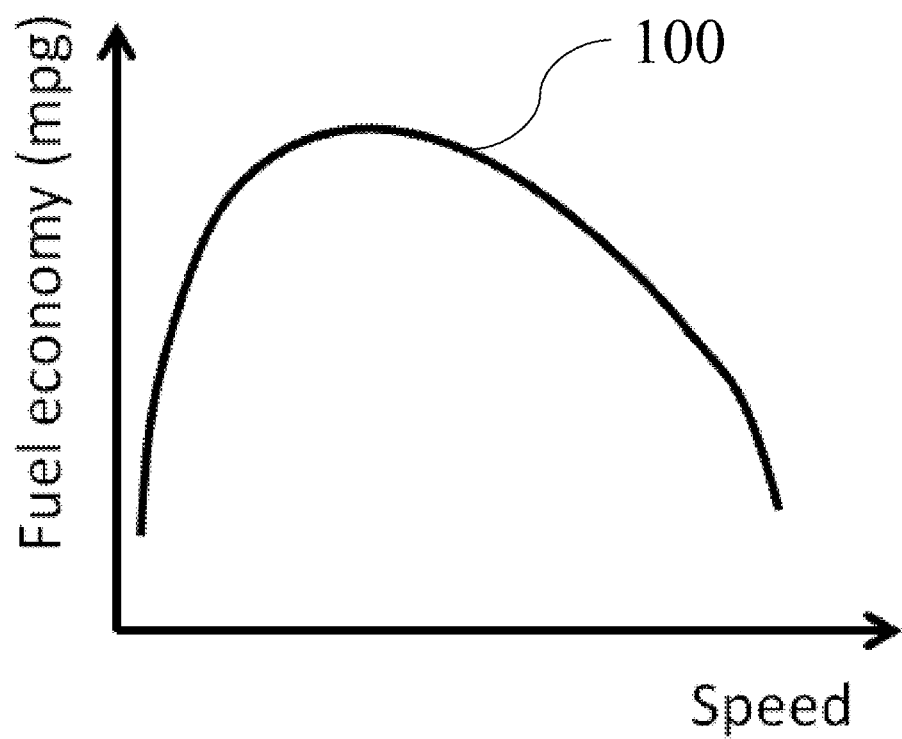
FIG. 1 illustrates a typical fuel efficiency curve for level terrain.

There are several aspects that affect the fuel efficiency curve of a given vehicle. FIG. 1 shows a typical fuel efficiency curve 100 for a single gear ratio such as a generator. As the RPMs of the engine go to zero, the engine will lug or stall. At low RPMs the engine runs at undesirable volumetric efficiency often producing incomplete combustion and therefore lowering efficiency. As the RPMs go to the higher end of the curve, the non-linear effects of the viscous friction of liquids and gases, heat dissipation limits, and torque limits on the parts become overwhelming factors that decrease fuel efficiency.

It is also known that for many engines, the load that the engine is subject to, deforms this curve and in general moves the optimal RPMs to a different speed mostly because engines would stall at lower RPMs for higher loads. This is important, because the optimal RPMs and the resulting speed can be obtained only if the engine load is known, and this load will depend on the vehicle state and the slope that the vehicle is being subject to.

The method of the present invention, although explained through and applied to gasoline or diesel engines, is and may be adapted to electric motors. Electric motors also have cusps in their efficiency versus speed curves where the optimal speed is neither at the lowest or the highest rpms, similar to gasoline or diesel engines. Thus, the optimal RPMs of an electric motor and the resulting speed can be obtained only if the engine load is known, and this load will depend on the vehicle state and the slope that the vehicle is being subject to, in the same manner as discussed for a gasoline or diesel engine.

Figure 2:
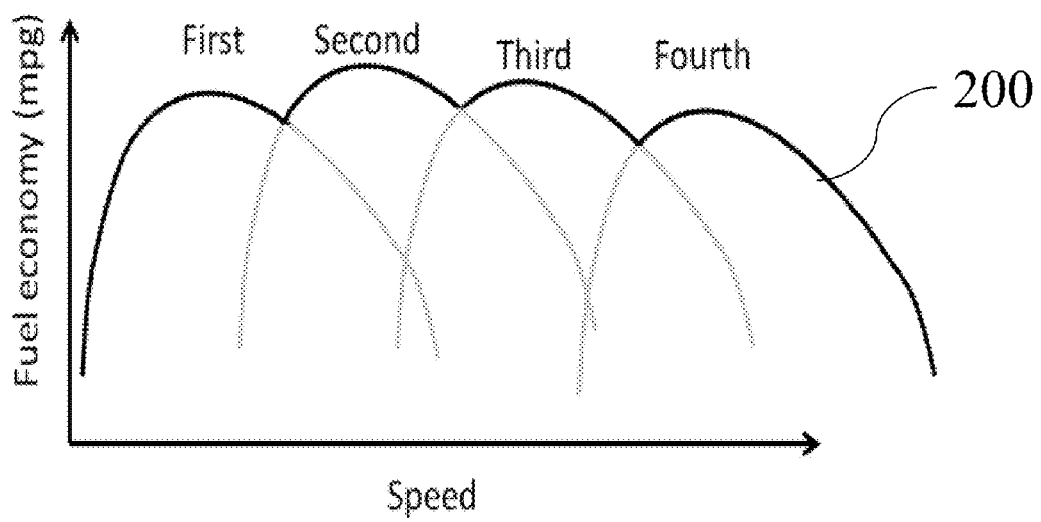
FIG. 2 illustrates the typical fuel efficiency for a four gear transmission.

Adding a transmission with multiple gear ratios extends the range of output speeds at which the vehicle can be operated. FIG. 2 shows a typical fuel efficiency of a vehicle with a four gear transmission 200. A "gear shift" is achieved by the automatic transmission to extend the speed at which the engine can provide useful torque without exceeding its maximum and minimum RPMs. Once again, this curve 200 is affected by the load on the engine, and therefore, the slope that the vehicle is driving. Modern shift control systems account for the fact that the driver may be driving more aggressively or carrying extra load (i.e. towing) to change the points at which the gear change happens. This often manifests as selectable or automatic transmission settings of "off road", "economy" or "towing" modalities available in higher end vehicles.

As a vehicle climbs a slope, some energy is converted to potential energy. This energy comes from additional energy output from the motor through the increase in motor load necessary to climb the slope or from a reduction of kinetic energy through the reduced speed as the vehicle climbs the slope. When the vehicle descends a slope, the opposite occurs. Potential energy is reduced allowing a reduced energy output from the motor resulting in a decreased motor load or an increase in kinetic energy resulting in increased speed. This energy transfer can be exploited to adjust motor load and optimize fuel efficiency.

As the engine load increases, the torque output increases at constant speed. The higher the load, the higher the torque requirements and the lower the fuel efficiency will be for the same speed at a particular gear. The load depends on a variety of components including the mass of the vehicle, tire inflation, terrain type, drag, and most importantly slope of the terrain.

Through with the widespread usage of GPS and navigation systems, it is now possible to obtain elevation profiles for most of the world. There are several sources for that information, some examples include: commercially available mapping products and military collected DTED data. In one embodiment of the invention, no elevation profile is necessary as the system will learn the elevation profiles of previously followed routes.

The present invention is a method and system that utilizes the energy storage provided by a vehicle's mass in the form of potential and kinetic energy to optimize the fuel consumption. The method and system of the present invention optimizes speed, taking into consideration the efficiency curve of the motor/gear combination for a given load.

One embodiment of the present invention is in the form of a "cruise control" that optimizes the speed within a speed range provided by the driver given the elevation profile of all or part of the route the that vehicle will follow.

Figure 3:
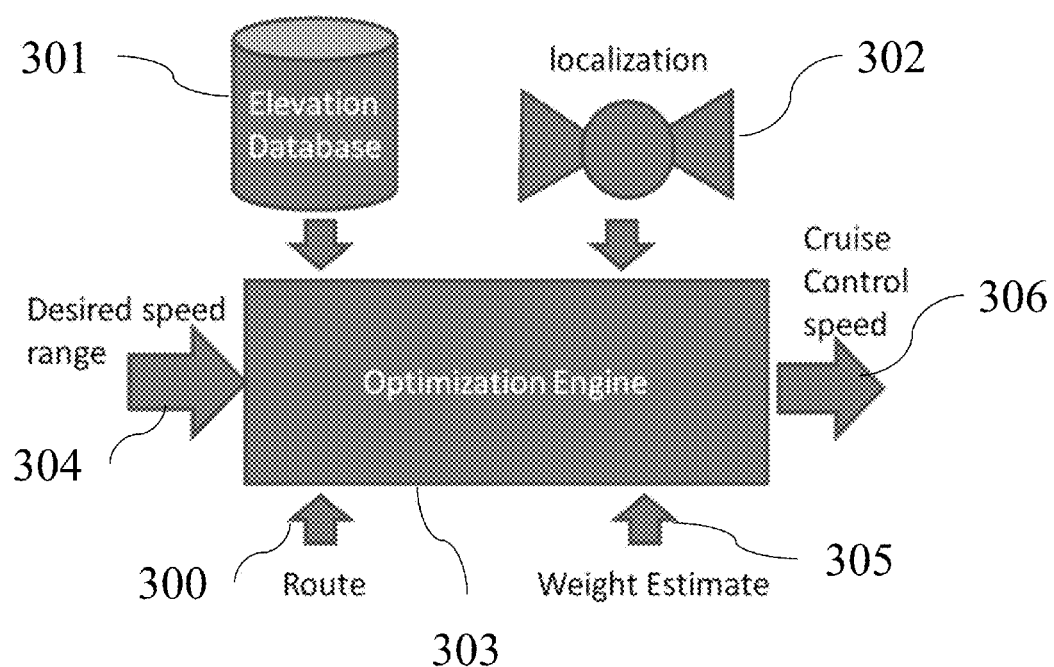
FIG. 3 illustrates the overall system design of the present invention.

Now referring to FIG. 3, the system of the present invention is composed of an elevation database 301, a localization mechanism 302, and a speed optimization mechanism/engine 303 executed by a computer running software containing the instructions for the modules/components of the present invention to determine the optimal ranges and functionality of the invention and vehicle. The optimization engine 303 receives a desired speed range 304 from the operator such as a max speed and min speed input, and a route or elevation profile 300 form the elevation database 301. Then, utilizing the elevation database 301, the localization mechanism 302 and a weight estimate 305 the system and method optimizes the current speed to minimize fuel consumption by way of setting and adjusting the cruise control speed 306. The route and the weight estimate may be provided or predicted by the optimization engine 303.

For example, if the vehicle has been in a particular route for a certain amount of time it would be assumed to continue being on that route or a more sophisticated algorithm may predict a particular turn given previous routes or based on historical traffic data. The elevation database may be provided or it may be learned from previous routes.

There are a variety of methods for optimizing the cruise control speed for the proposed system. Techniques available for optimization include: integer programming, dynamic programming, simplex related algorithms, and standard neural networks. There is also the possibility of pre-computing and storing much of the optimization results.

In a render to practice implementation the inventors utilized a simple, relatively brute force search mechanism for finding the optimal speed. At each moment of time, the control optimization engine 303 may change the throttle and gear setting. By discretizing time and concatenating sequences of throttle and gear commands, different control strategies are generated. The inventors call these acceleration/deceleration sequences: acceleration profiles.

The acceleration profiles are simulated on a kinematic and dynamic model of the system that takes under consideration the elevation profile, wind conditions, the weight, torque and speed limit ranges. The simulator shows that some of these profiles are predicted to exceed the assigned speed ranges, and some will not. Within the profiles that maintain the vehicle inside the speed range for the elevation profile, there will be an optimal profile from the fuel economy standpoint.

Figure 4A:
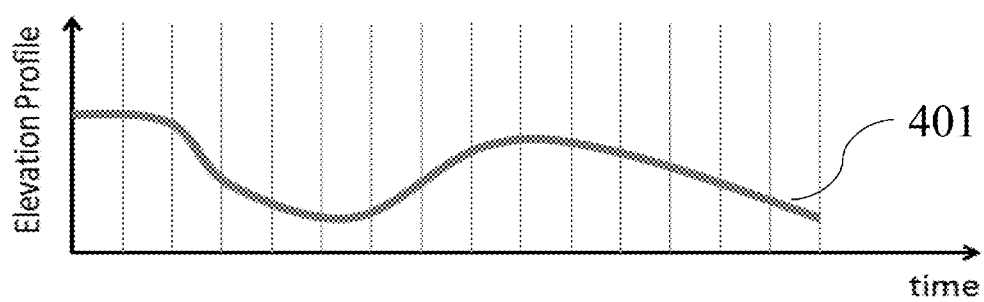
FIG. 4a shows an elevation profile.
Figure 4B:
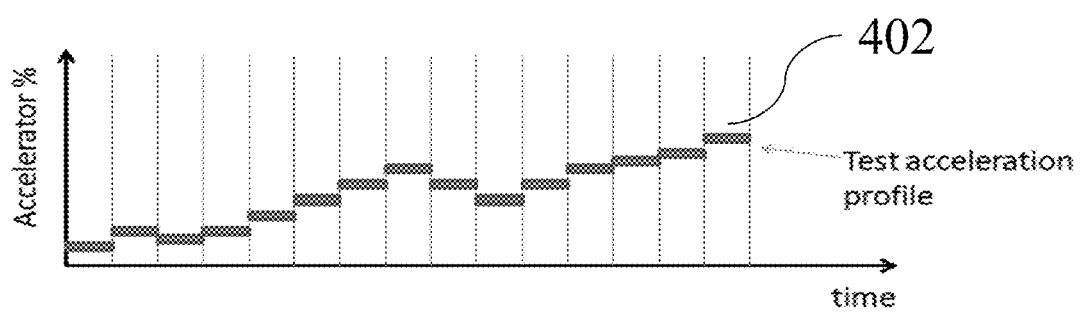
FIG. 4b shows a test acceleration profile.
Figure 4C:
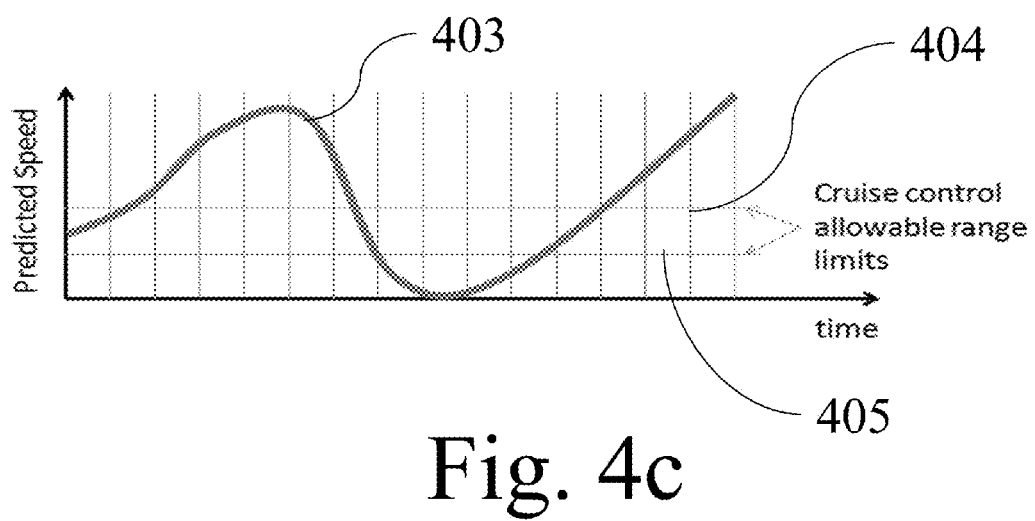
FIG. 4c shows a resulting predicted speed profile.

FIGS. 4a-c show, an elevation profile 401, a test acceleration profile 402, and finally the resulting predicted speed profile 403. The predicted speed profile 403 as shown in FIG. 4c for the test acceleration profile 402 of FIG. 4b exceeds the cruise control limits 404 and 405 set by the operator and therefore it is not a possible control strategy.

Figure 5A:
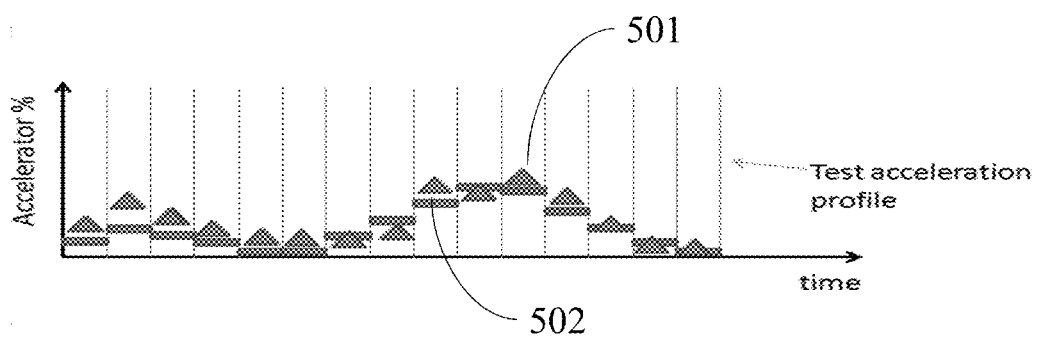
FIG. 5a illustrates two acceleration profiles denoted by squares and triangles which are simulated to compute fuel efficiency and fitness within the speed ranges set by the cruise control.

On FIG. 5a, two acceleration profiles 501 and 502, represented by squares and triangles respectfully, are simulated to compute fuel efficiency and fitness within the speed ranges 503 and 504 set by the cruise control. Since both profiles 501 and 502 meet the speed constraints 503 and 504, the acceleration profile with the best fuel efficiency is selected. The optimization engine 303 generates a large number of these acceleration profiles until the best possible fuel efficiency is achieved for the time allotted for computations.

Figure 5B:
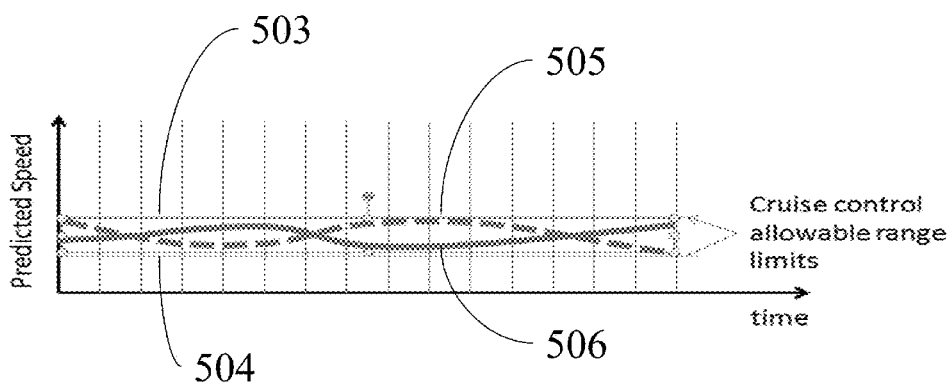
FIG. 5b illustrates two valid, within speed range, acceleration profiles that are compared for fuel efficiency.

Referring to FIG. 5b, two valid, within speed range, acceleration profiles 505 and 505 are compared for fuel efficiency.

There are a variety of search techniques that will simplify the generation of these acceleration profiles to minimize the simulation sequences that must be performed. For example the acceleration profiles can be generated in a search tree starting from the current acceleration level. Then, the simulator will only predict the speed of the vehicle for a time discrete, until the new branch of the acceleration profile is created at the next time discrete. This piece-wise search technique can prune non-conforming parts of the tree as they hit the cruise control speed limits set by the operator.

Figure 6:
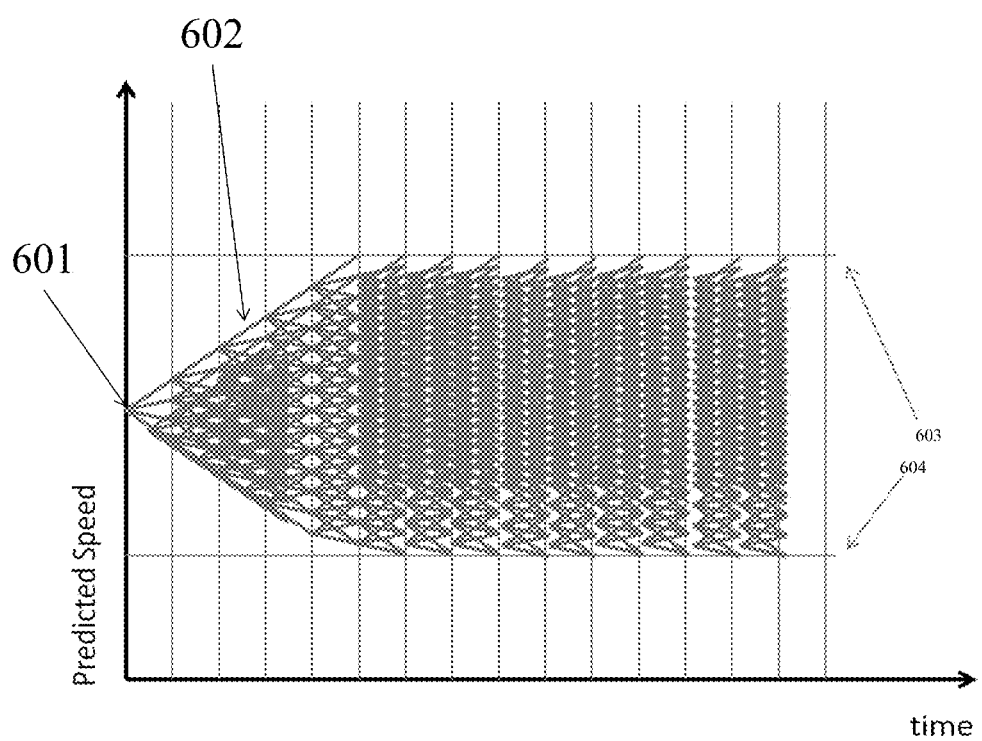
FIG. 6 illustrates how the optimization algorithm starts from the current velocity of the vehicle, and expands a search tree from each resulting child velocity until the speed constraints set by the operator are reached.

In FIG. 6, the optimization algorithm starts from the current velocity of the vehicle 601, and expands a search tree 602 from each resulting child velocity until the speed constraints 603 and 604 set by the operator, such as cruise control allowable range limits, are reached. Each resulting partial speed profile is then evaluated for performance.

Another mechanism for performing this optimization is based on a genetic algorithm which can generate multiple acceleration or speed profiles comprised of various chromosomes where each chromosome is composed of a partial section of the acceleration profile and the fitness function is based on fuel efficiency. Time horizons and control discretization can vary depending on the computational capabilities of the implementation.

Figure 7:
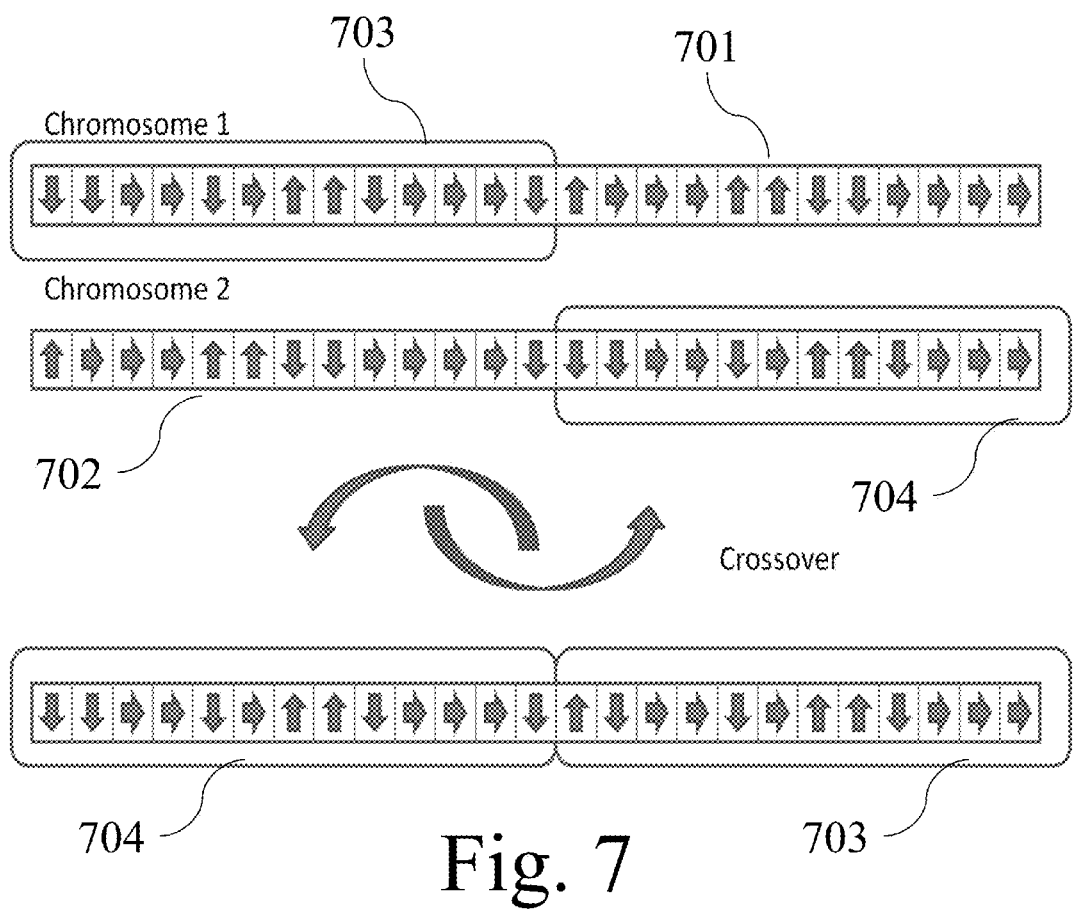
FIG. 7 illustrates how chromosomes are defined where the speed is increase, decreased, or kept the same starting from the initial velocity.

In FIG. 7 chromosomes 701 and 702 are defined where the speed is increased as shown by a up arrow, decreased as shown by a down arrow, or kept the same as shown by a right arrow starting from the initial velocity. These chromosomes are tested against the speed constraints and evaluated for fuel economy. A subset of the first chromosome 703 and a subset from the second chromosome 704 are selected in this example, and crossover is applied to these selected chromosomes 703 and 704 which changes their order for subsequent testing against the fitness function. This new generation of speed profile is once again tested for fit against constraints. The process is repeated until search time is exhausted.

The method for optimizing fuel consumption of a vehicle taught by the present invention is executed by a computer or equivalent device and made be stored locally or remotely in a storage database. First the computer executing the method receives a desired speed range and vehicle characteristics. The computer also receives an elevation profile. A localization mechanism determines location within the elevation profile using. The computer, executing the software embodying the method of the present invention, then calculates one or more speed profiles by an optimization engine to optimize the fuel economy of a vehicle based on the vehicle and terrain characteristics. Finally a selection is made of a speed profile that maintains the vehicle within the assigned range of speed and minimizes fuel consumption.

In an alternative embodiment, the route and elevation profiles may be received from an elevation database either remotely or one stored on the local computer.

In a convoy embodiment, the method teaches receiving multiple vehicle characteristics for two or more vehicles traveling in a convoy. The computer receives maximum and minimum convoy separation distances for each vehicle in the convoy. Next the method then either determines or receives acceleration profiles for all the vehicles in the convoy. The method then considers the fuel consumption of the complete convoy and calculates a range of cruise control speeds by an optimization engine to optimize the fuel economy of a convoy of vehicles based on the fuel consumption of the complete convoy and terrain characteristics.

The optimization engine stores the calculated results and may also include pre-stored tables in a computer database for common vehicles, routes, or situations including such information as vehicle weight, terrain type, acceleration, torque, or fuel input into the engine of various vehicles gear ratios of various vehicles and a gear optimization algorithm. In alternative embodiments the method will include learning the elevation profiles or previously followed routes to provide better and more accurate calculations.

During the calculation phase, the range of speeds is assigned as a desired speed and a range of allowable deviation. Selecting speeds that are closer from the desired speed over speeds that are further away from the desired speed is one objective of the present invention. Additionally, the method of the present invention may use a compound cost function that includes fuel efficiency and delta speed from desired speed in the calculation or simply select the speed optimization which only uses the best fuel economy based on an assumed flat terrain.

The computer executing the method of the present invention is equipped with a display and controls for use by a person/operator. The display shows speeds, gears, and shifting points as recommended to an operator in real time based on the factors provided for consideration such as vehicle type and terrain and may also include an output for sending a command to an engine controller. This display can also provide a warning to the driver that the speed selection is a threshold away from the optimal speed for a given location. An operator will receive predicted fuel expenditures at each speed range selected before driving starts.

Depending on the application, the method of the present invention may also take into consideration setting the speed ranges by maximum and minimum speed limits set by the transportation rules, or setting the minimum speed range by the operator in an off road situation. In either situation the method allows for setting different speed ranges for different slopes or terrain. The system may obtain elevation profiles from telephone, wifi, or satellite connections or use elevation profiles provided from earlier vehicles in the convoy or earlier vehicles not related to the present convoy.

In yet another embodiment, the method of the present invention may specific an arrival time, or calculate the optimal speed to arrive at the destination before the set arrival time. This calculation may also include the predicted trajectory of travel to extract elevation given the road that the vehicle is driving. Additional the method of the present invention may use wind or traffic information gathered from the vehicle, other vehicles in the convoy, or transmitted to it from another source.

Since the predicted speeds somewhat deviate from reality because of errors in the model, the cruise control system will "re-plan" its acceleration profiles in a control loop. The frequency of this re-plan mechanism depends on the computational capabilities of the system.

The military and other logistic enterprises sometimes perform convoys of vehicles for a variety of applications. When the vehicles are equipped with current cruise control systems, with a single speed setting, similar problems with fuel economy have been observed. The proposed system can be utilized to optimize the speed of the convoy given the constraints imposed by the maximum and minimum convoy separation distances. In this scenario, the acceleration profiles will not only include the accelerations for a single vehicle but the acceleration profile for all the vehicles in the convoy. As in the single vehicle case, the simulator will compute the fuel efficiency for each vehicle and the decision on what multivehicle acceleration profile is better takes under consideration the fuel consumption of the complete convoy. In the multivehicle case, multivehicle acceleration profiles may be eliminated given the separation maximum and minimum constraints as well as the individual vehicle speed constraints. With most convoys some feedback mechanism exist to execute the convoy and to maintain separation distances. In the multivehicle optimization case communication between vehicles may be necessary to correct for errors between the simulated speeds and the actual speeds.

The model for the simulator of the present invention includes understanding of inertia, conservation of kinetic and potential energy. Moreover, in order to compute fuel economy it will take under consideration the engine and transmission utilized, as well as the points at which the automatic transmission will do the gear shift. As expected the simulator uses the elevation profile and predicted weight of the vehicle to do these computations. Complex simulators may perform finite element analysis of the dynamic of the vehicle including suspensions and fluids within the engine and transmission. Much simple models already provide fuel economy improvements. It is also possible to tabulate the simulation results to predict the speed and fuel economy given a sub sampling of the elevation profile. Other simulators may include neural networks or simpler Newtonian models of the vehicle.

Although the present invention teaches an optimization engine that searches on the acceleration space, there are simple transformations that would allow the same technique to be used utilizing other equivalent control sequences. For example, an equivalent system could search in the torque domain, in the jerk domain, in the speed domain, in the position domain, and even in the RPM domain. These simple variable changes do not affect the functionality of the proposed system. For example, instead of generating an acceleration profile, an equivalent torque profile can be generated. The simulator will use the torque profile (instead of acceleration profile) to generate speeds for constraint checking and for fuel economy comparison. Similarly another system can generate speed profiles that are then checked for fuel economy utilizing the elevation profile and the weight of the vehicle. The common elements of the proposed system include the knowledge of the elevation profile, and the range of allowable cruise control speeds.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A method for optimizing fuel consumption of one or more vehicles, executed by a computer, comprising:
   receiving a desired speed range and vehicle characteristics;
   receiving an elevation profile;
   determining location within the elevation profile using a localization mechanism;
   calculating one or more speed profiles by an optimization engine to optimize a fuel economy of the vehicle based on the vehicle and terrain characteristics;
   using a potential and kinetic energy transfer to adjust motor load and optimize fuel efficiency over the elevation profile;
   selecting the speed profile that maintains the vehicle within an assigned range of speed and minimizes fuel consumption;
   receiving multiple vehicle characteristics for two or more vehicles traveling in a convoy;

receiving maximum and minimum convoy separation distances for each vehicle in the convoy;

determining or receiving acceleration profiles for all the vehicles in the convoy;

considering the fuel consumption of the complete convoy utilizing the energy storage provided by each vehicle's mass from the convoy in the form of potential energy as a battery to save energy;

converting the potential energy provided by each vehicle's mass from the convoy into kinetic energy to optimize the fuel consumption calculation;

calculating a range of cruise control speeds by the optimization engine to optimize the fuel economy of the convoy of vehicles based on the fuel consumption of the complete convoy and terrain characteristics; and optimizing a combination of vehicles in the convoy as a whole, providing better fuel savings than individual optimization on each of the two or more vehicles traveling in the convoy separately.

2. The method of claim 1, further comprising
receiving a route and elevation profile from an elevation database; and
using the potential and kinetic energy transfer to adjust motor load and optimize fuel efficiency over the route based on the elevation data.

3. The method of claim 1, wherein the results of the optimization engine are pre-stored in tables in a computer database.

4. The method of claim 1, further comprising learning the elevation profiles of previously followed routes.

5. The method of claim 1, further comprising estimating a weight of each vehicle for better accuracy of simulation.

6. The method of claim 1, further comprising estimating a terrain type.

7. The method of claim 1, wherein an output of the optimization engine is acceleration, torque, or fuel input into an engine.

8. The method of claim 1, wherein gear optimality is taken under consideration in the calculation of both one or more speed profiles and a range of cruise control speeds.

9. The method of claim 1, wherein the range of speeds is assigned as a desired speed and a range of allowable deviation when calculating the one or more speed profiles.

10. The method of claim 1, further comprising:
selecting speeds that are closer to a desired speed over speeds that are further away from the desired speed; and
using a compound cost function that includes fuel efficiency and delta speed from desired speed in the calculation when calculating the one or more speed profiles.

11. The method of claim 1, wherein speeds are recommended to an operator.

12. The method of claim 1, wherein speeds are sent as a command to an engine controller.

13. The method of claim 1, wherein an operator will receive predicted fuel expenditures at each speed range selected before driving starts.

14. The method of claim 1, further comprising:
setting maximum and minimum speed limits by one or more transportation rules for the desired speed range, the assigned range of speed, and the range of cruise control speeds, or
setting a minimum speed range by the operator for the desired speed range, the assigned range of speed, and the range of cruise control speeds.

15. The method of claim 1, further comprising setting different speed ranges for different slopes.

16. The method of claim 1, further comprising
setting different speed ranges depending on terrain; and
using the potential and kinetic energy transfer to adjust motor load and optimize fuel efficiency over a route based on the terrain.

17. The method of claim 1, further comprising obtaining elevation profiles from telephone, wifi, or satellite connections.

18. The method of claim 1, further comprising
using elevation profiles provided from earlier vehicles in a convoy or earlier vehicles not related to a present convoy; and
using the potential and kinetic energy transfer to adjust motor load and optimize fuel efficiency over a route based on the elevation profiles.

19. The method of claim 1, further comprising suggesting speeds and gears in real time to an operator.

20. The method of claim 1, further comprising warning a driver that a speed selection is a threshold away from an optimal speed for a given location.

21. The method of claim 1, further comprising optimizing one or more shifting points on a transmission given the speed profile computed.

22. The method of claim 1, further comprising:
specifying an arrival time;
calculating an optimal speed to arrive at a destination before a set arrival time.

23. The method of claim 1, further comprising
predicting a trajectory of travel to extract elevation given a road that the one or more vehicles traveling in a convoy are driving; and
using the potential and kinetic energy transfer to adjust motor load and optimize fuel efficiency over a route based on a projected trajectory and elevation data.

24. The method of claim 1, further comprising using wind information in the calculation of both one or more speed profiles and the range of cruise control speeds.

25. The method of claim 1, further comprising using traffic condition information in the calculation of both one or more speed profiles and the range of cruise control speeds.

* * * * *